(12) United States Patent
Shibata

(10) Patent No.: US 6,360,622 B1
(45) Date of Patent: Mar. 26, 2002

(54) COORDINATE INPUT DEVICE

(75) Inventor: Naohiko Shibata, Fujisawa (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/571,866

(22) Filed: May 16, 2000

(30) Foreign Application Priority Data

Aug. 2, 1999 (JP) .......................................... 11-219134

(51) Int. Cl.⁷ .............................. G06F 3/33; G01L 5/22
(52) U.S. Cl. .................... 73/866.1; 73/862.05; 345/161
(58) Field of Search ........................... 73/866.1, 865.7, 73/862.041, 862.05, 862.55, 767, 712, 773, 774; 345/161

(56) References Cited

U.S. PATENT DOCUMENTS 4,540,463 A * 9/1985 Kakuhashi et al. ......... 216/105
5,754,167 A * 5/1998 Narusawa et al. .......... 345/161
6,108,613 A * 8/2000 Kimura et al. ....... 73/862.05 X

FOREIGN PATENT DOCUMENTS

JP 7-174646 7/1995 ............. G06F/3/33
JP 7-244559 9/1995 ............. G06F/3/33

* cited by examiner

Primary Examiner—Thomas P. Noland
(74) Attorney, Agent, or Firm—Oliff & Berridge, PLC

(57) ABSTRACT

A coordinate input device comprises a base (10) having a plate shaped distortion generating part (12) below a pole shaped operating part which are integrally formed; and a detection sensor (20) having a plurality of distortion gauges (22) (four) and a plurality of leads (23) connected to the distortion gauges which are integrally arranged on one plastic sheet (21). In the coordinate input device, the plurality of distortion gauges (22) are put together in the arrangement of a cross shape so that the distortion gauges are bonded at prescribed positions on the back surface of the distortion generating part (12) by using a cross index (25) which is previously attached to the sheet (21). The plurality of leads (23) are arranged in parallel and extended sideward the base (10). Accordingly, a workability and accuracy in assembly can be improved and the operating part can be made compact without increasing the burden of cost or deteriorating installation workability. Therefore, the coordinate input device which greatly contributes the decrease in thickness in a portable personal computer can be provided.

3 Claims, 4 Drawing Sheets

COORDINATE INPUT DEVICE

BACKGROUND OF THE INVENTION

1. Field of the Invention

The present invention relates to a coordinate input device for inputting two-dimensional coordinates, and more particularly to a coordinate input device preferably employed as a stick type pointing device for controlling a position of a cursor on a display of a computer.

2. Description of the Related Art

In general, a coordinate input device of this type has hitherto had a structure, as shown in FIGS. 6 and 7, in which four or two distortion gauges 3 composing a detection sensor are bonded to the four or two surfaces of a prismatic operating part 2 provided at the central part of a base 1, an annular connecting part 5a at the end of a cable 5 in which a plurality of leads 4 are arranged is fixed to the upper surface of the base 1 by being passed through the operating part 2, and the distortion gauges 3 are respectively connected to the leads 4 of the cable 5 by soldering. In the coordinate input device, the operating part 2 is formed with a hollow structure and serves as a distortion generating part. When force is exerted on the operating part 2 from the forward and backward directions and the right and left directions, the operating part 2 is distorted so that electric resistance value of each distortion gauge 3 changes. The signal of the electric resistance value is transmitted to a detection circuit (not shown) through the cable 5 to detect the direction and intensity of the force applied to the operating part 2, as disclosed in, for example, Japanese Patent Application Laid-Open No. Hei 7-244559. The connection parts of the distortion gauges 3 and the cable 5 are protected by a protective layer 6 such as rubber.

When the above-described coordinate input device is employed as a stick type pointing device, the coordinate input device is mounted on the substrate of a keyboard input device by using leg parts 7 protruding onto the back surface of the base 1. Then, the operating part 2 is projected between the key caps of groups of key switches and covered with a cap 8 so as to enable to be operated by fingers of a user. Further, the other end of the cable 5 is connected to the control part of the computer. In such a stick type pointing device, operation of the operating part 2 by the fingers of a user through the cap 8 makes the signal of each of the distortion gauges 3 inputted to the control part. The control part calculates the direction of movement, the amount of movement, the moving speed, or the like of a cursor on a display on the basis of the signal from the distortion gauge 3 to control the position of the cursor.

However, upon assembling, according to the above-mentioned conventional coordinate input device, since a plurality of distortion gauges 3 are individually bonded to the operating part 2 of the base 1, and then, the respective distortion gauges 3 need to be soldered to the cable 5, a workability in assembling these members is extremely deteriorated. Besides, since the unevenness of positions where the respective distortion gauges 3 are bonded cannot be avoided, it has been undesirably difficult to ensure high accuracy.

Further, in recent years, a demand for the decrease in thickness of a portable personal computer such as a notebook personal computer, a mobile computer has been more and more increased. However, according to the structure of the conventional coordinate input device in which the distortion gauges 3 are stuck to the pole shaped operating part 2 as described above, the size of the distortion gauge 3 cannot be reduced to a dimension smaller than a prescribed dimension in view of its accuracy and there exists a limitation in reducing the height of the operating part 2. Therefore, it has been inconveniently impossible to meet the above-mentioned demand for the decrease in the thickness of the portable personal computer.

Furthermore, for example, Japanese Patent Application Laid-Open No. Hei 7-174646 discloses a pointing device of a type that an elastic plate is attached to a mount base supported at three points or four points, a pole shaped operating part is connected to the central part of the elastic plate, the elastic plate is used as a distortion generating body, and a plurality of distortion detecting resistance elements, that is to say, distortion gauges are disposed on the elastic plate. According to this pointing device, since the distortion gauges do not need to be stuck to the operating part, the height of the operating part can be reduced, which can contribute to the decrease in thickness of the portable personal computer. However, even this structure is no different from the conventional device in that, since a plurality of distortion gauges must be individually bonded to the device, the deterioration of accuracy due to the deterioration of workability in assembling the components or the unevenness in fixed positions of the distortion gauges cannot be avoided. Therefore, this structure does not provide a primary countermeasure. In addition, since not only the mount base needs to be specially prepared, but also a troublesome assembling work for attaching the elastic plate onto the mount base is required to increase the burden of cost. Furthermore, since the distortion gauges are arranged so as to be distributed in a wide range on the elastic plate, it is disadvantageously complicated and troublesome to handle or treat a cable connected to the distortion gauges. Thus, this brings about a new problem in that the installation workability in mounting the pointing device on a substrate of the keyboard input device is deteriorated.

SUMMARY OF THE INVENTION

The present invention has been made in view of the above problems of the conventional device and an object of the present invention is therefore to provide a coordinate input device in which a workability in assembling parts and accuracy can be improved and an operating part can be made compact without increasing the burden of cost or deteriorating an installation workability so as to remarkably contribute to the decrease in the thickness of a portable personal computer.

In order to achieve the above-described object, according to the present invention, a coordinate input device comprises a base having an plate shaped distortion generating part below a pole shaped operating part which are integrally formed; and a detection sensor having a plurality of distortion gauges and a plurality of leads connected to the distortion gauges which are integrally arranged on one plastic sheet, and is characterized in that the detection sensor has a structure in which the plurality of distortion gauges are put together so that the distortion gauges are bonded to the back surface of the distortion generating part of the base, and the plurality of leads are arranged in parallel and extended in one direction from the base.

In the coordinate input device thus constructed, only the detection sensor is bonded to the back surface of the distortion generating part of the base formed integrally therewith so that a plurality of distortion gauges and leads can be simultaneously attached thereto with high efficiency and high accuracy. Further, since it is not necessary to stick the distortion gauges to the operating part, the height of the operating part can be reduced as much as possible.

Further, according to the coordinate input device of the present invention, the number of the distortion gauges provided in the detection sensor may be two or four. When the four distortion gauges are provided on the detection sensor, they may be desirably put together in a cross shaped arrangement.

In this case, a cross index for indicating the central position of the four distortion gauges and the arrangement directions thereof is provided on the sheet of the detection sensor and a through hole of a square shape in section which passes through the distortion generating part from the upper end of the operating part is formed in the operating part of the base. Thus, the cross index is aligned with the through hole so that the detection sensor can be simply and accurately positioned.

BRIEF DESCRIPTION OF THE DRAWINGS

Other characteristics will appear on reading the description which follows with reference to the attached drawings in which.

DESCRIPTION OF THE PREFERRED EMBODIMENTS

Figure 1:
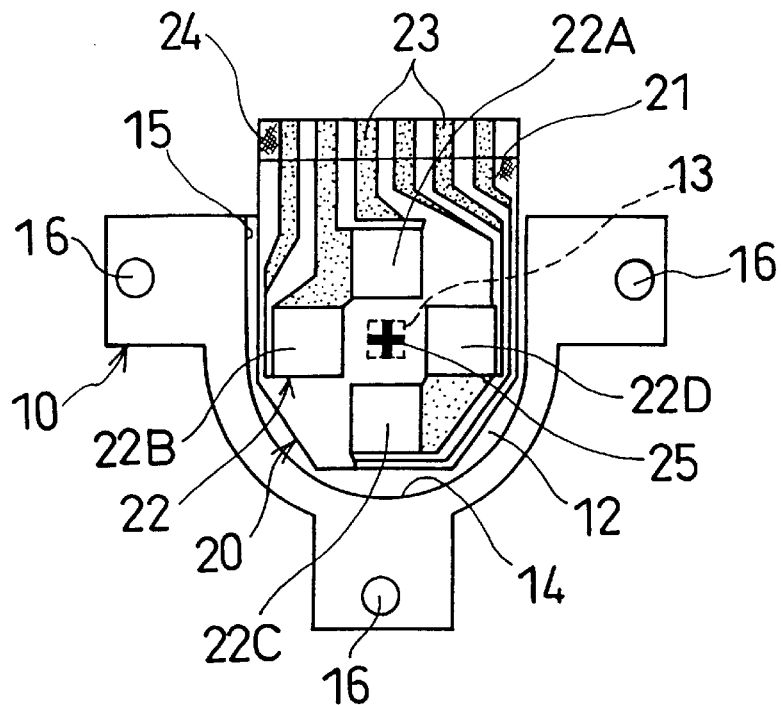
FIG. 1 is a plan view showing the structure of a coordinate input device according to the present invention when viewed from the back surface side thereof.
Figure 2:
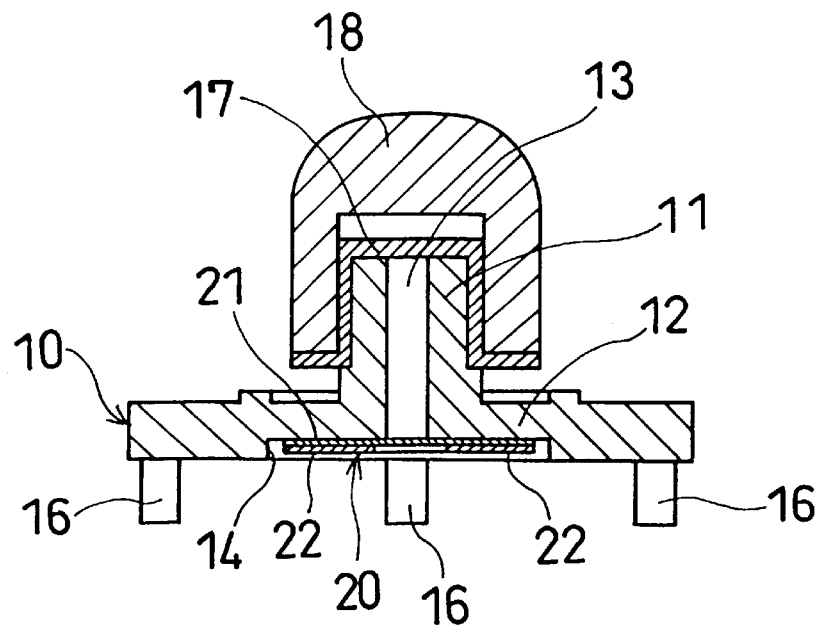
FIG. 2 is a sectional view showing the structure of the coordinate input device according to the present invention.
Figure 3:
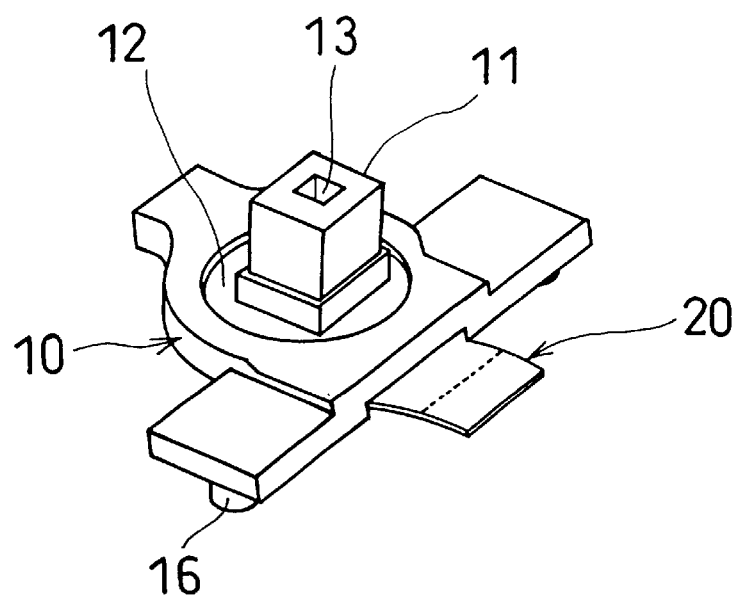
FIG. 3 is a perspective view showing the structure of the coordinate input device of the present invention.

Now, an embodiment of the present invention will be described in more detail on the basis of the accompanying drawings.

FIGS. 1 to 4 illustrate one embodiment of a coordinate input device according to the present invention. Referring to these figures, reference numeral 10 designates a base having a distortion generating part 12 below a square prism shaped operating part 11. 20 designates a detection sensor including four distortion gauges 22 (22A, 22B, 22C and 22D) and a plurality of leads 23 connected to the distortion gauges 22 which are arranged on one plastic sheet 21 and a plastic laminate film 24 superposed thereon. The detection sensor 20 is bonded to the back surface of the distortion generating part 12 of the base 10.

The base 10 is formed into substantially a T shape as a whole and is integrally formed with a resin material. The operating part 11 is disposed substantially at a position of the center of gravity of the base 10 and a square shaped through hole 13 passing through the distortion generating part 12 from the upper end of the operating part is bored in the operating part, Further, the distortion generating part 12 is set in a circular thinned part about the operating part 11. On the back surface of the base 10, a circular recessed part 14 formed due to the decrease in thickness is provided. Further, on the back surface of the base 10, is formed a linear recessed part 15 through which the circular recessed part 14 is opened on one side surface of the base 10. The detection sensor 20 is arranged in a series of recessed parts formed by connecting together the circular recessed part 14 and the linear recessed part 15 and a part of the detection sensor 20 is extended outside the base 10 via the linear recessed part 15. Incidentally, at the three corner parts of the back surface of the base 10, mounting leg parts 16 are protruded. An elastic cap 18 is mounted on the upper end part of the operating part 11 of the base 10 through an auxiliary cap 17.

The four distortion gauges 22 constituting the detection sensor 20 are respectively formed in substantially square shapes and the four distortion gauges are put together in the arrangement of a cross shape. These four distortion gauges 22 include two adjacent distortion gauges 22A and 22B, and another two adjacent distortion gauges 22C and 22D which are respectively arranged at intervals of 90° so as to have different orientations and each of the two adjacent distortion gauges are used as one pair. Further, the number of the leads 23 composed of the detection sensor 20, which is set to each pair of the distortion gauges 22 is three. Accordingly, the total number of the leads 23 is six. These leads 23 have their one end parts connected to each of the distortion gauges 22 in various kinds of patterns as illustrated by points in FIG. 1. On the other hand, the other ends parts of the leads 23 are extended in parallel sideward the base 10. Further, the other end parts of the leads 23 are exposed outside by partly stripping off the sheet 21. A cross index 25 for indicating the center of collection of the four distortion gauges 22 and the arrangement directions thereof is attached onto the sheet 21 on which these distortion gauges 22 and the leads 23 are arranged. The cross index 25 is employed for positioning the detection sensor 20 when the detection sensor 20 is bonded to the back surface of the distortion generating part 12 of the base 10. As shown in FIG. 1, the cross index 25 is aligned with the through hole 13 of the operating part 11, so that the respective distortion gauges 22 can be precisely positioned on the back surface of the distortion generating part 12.

Each distortion gauge 22 and each lead 23 respectively have, for instance, the thickness of about 55 μm. As methods for forming these distortion gauges 22 and the leads 23 on the sheet 21, are exemplified a variety of methods such as a photo-etching method, an ink printing method, a vapor deposition method, a sputtering method, etc. In order to form a thin film of the above-described thickness, it is desired to utilize the photo-etching method. In this case, many combination patterns composed of the distortion gauges 22 and the leads 23 as required for one detection sensor 20 are formed on the large sheet by employing the photo-etching method and the large laminate film 24 is superposed thereon to manufacture a product. Then, one detection sensor 20 is cut therefrom so as to obtain a prescribed configuration as shown in FIG. 1 and then, the detection sensor 20 is subjected to an assembling work described below. In this connection, as the sheet 21, a transparent or translucent sheet with the thickness of from about 50 to 55 μm may be desirably used. The cross index 25 is previously formed on the sheet 21.

Figure 4:
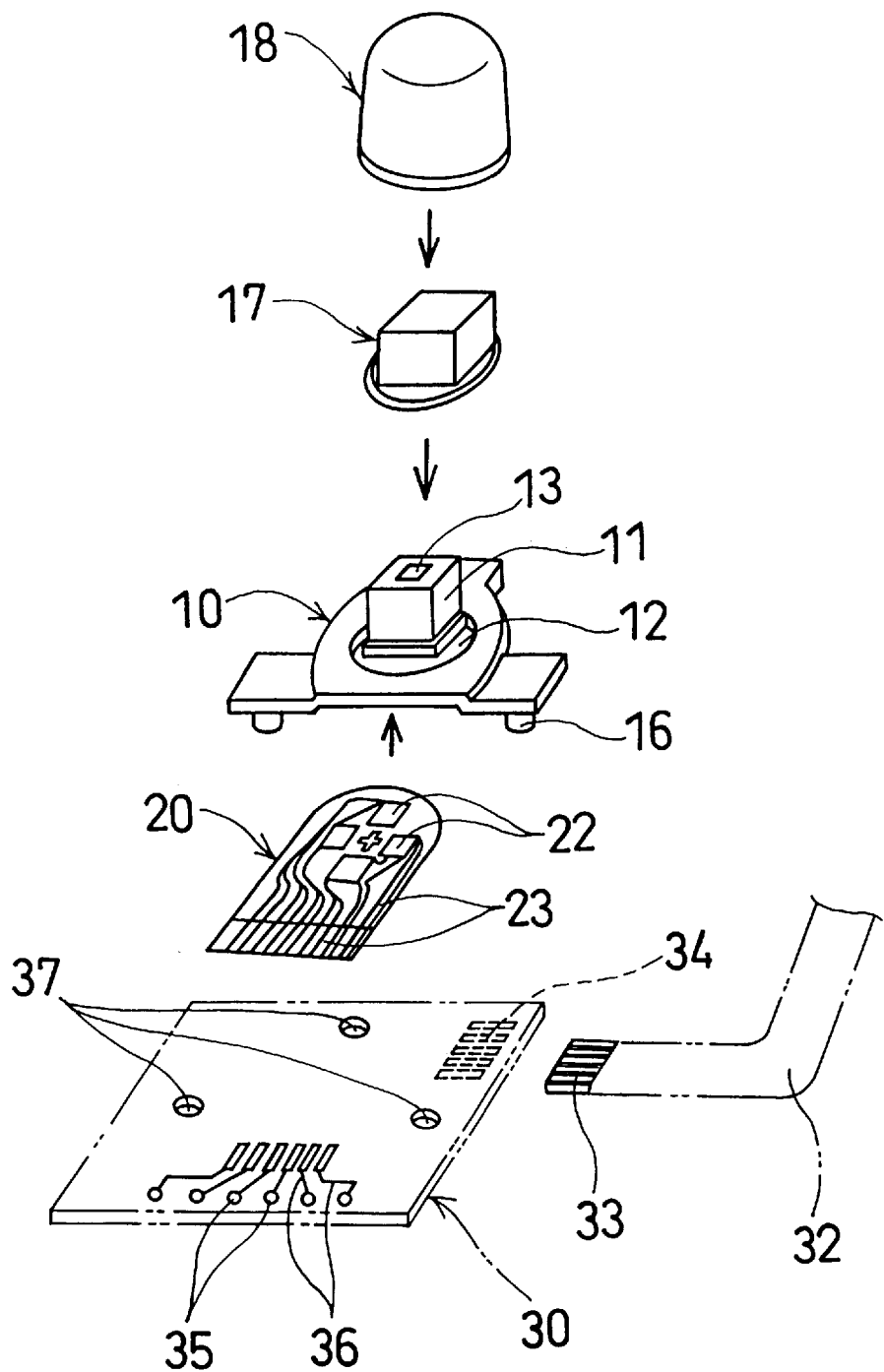
FIG. 4 is an exploded perspective view showing the structure and the assembled state of the coordinate input device according to the present invention.
Figure 6:
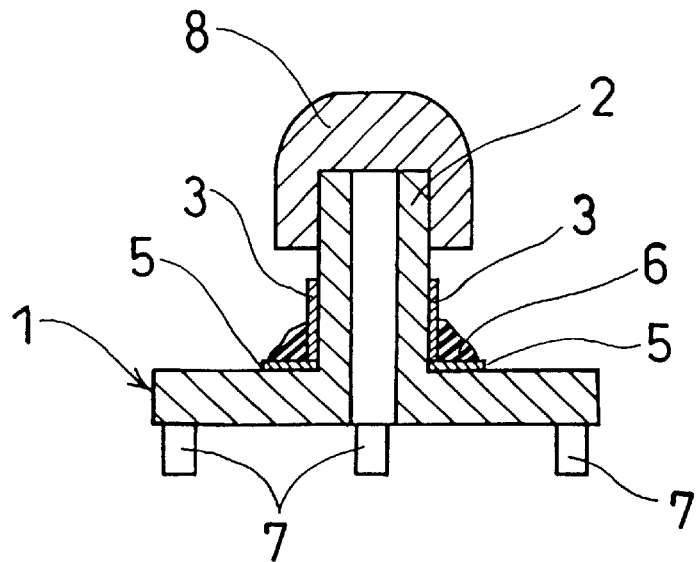
FIG. 6 is a sectional view showing the structure of a conventional coordinate input device.
Figure 7:
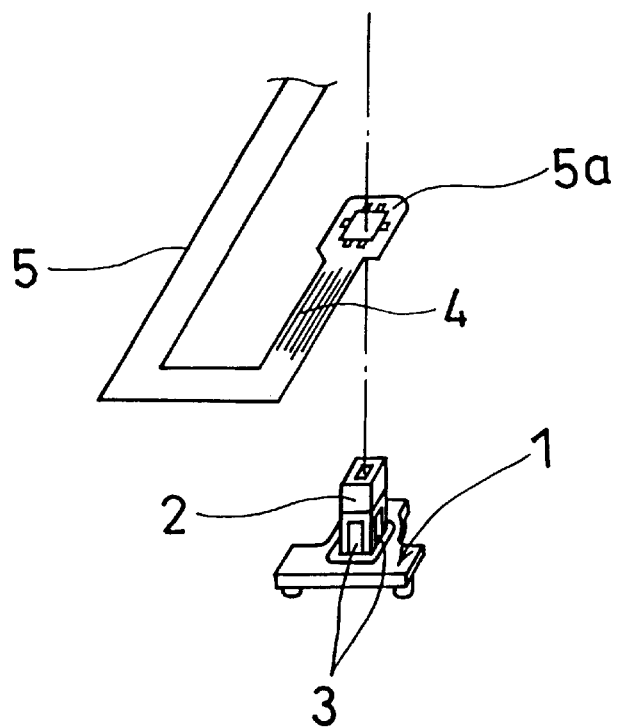
FIG. 7 is an exploded perspective view showing the structure of the conventional coordinate input device.

For assembling the coordinate input device according to the present invention, the detection sensor 20 obtained as described above is initially bonded to the back surface of the distortion generating part 12 of the base 10 by using an adhesive. Upon bonding the detection sensor 20 to the back surface of the distortion generating part, while the crone index 25 formed on the sheet 21 and the through hole 13 of the operating part 11 are collimated by a camera, the detection sensor 20 is positioned so that the cross index 25 is aligned with the through hole 13. For instance, the detection sensor 20 is automatically bonded to the back surface of the distortion generating part 12 of the base 10 by employing an automatic mechanism. After that, the cap 18 is coupled with the operating part 11 of the base 10 through the sub-cap 17, so that the coordinate input device is temporarily completed, and therefore, it may be directly mounted on the substrate of a keyboard input device. Further, a product formed by bonding the detection sensor 20 to the distortion generating part 12 of the base 10 may be treated as a subassembly body. Then, the subassembly body may be installed on a printed wiring board 30 as illustrated in FIG. 4 and put on the market as a high value added product.

When the high value added product is manufactured as described above, the printed wiring board 30, is prepared, in which terminals 31 capable of being connected to the plurality of leads 23 of the detection sensor 20 are arranged on a front surface and terminals 34 capable of being connected to the leads 33 of an extension cable 32 are arranged on a back surface, respectively, and wiring patterns 36 having both the terminals 31 and 34 connected via through holes 35 on both the front and back surfaces. Further, on the printed wiring board 30, through holes 37 into which the leg parts 16 of the base 10 can be inserted are previously opened. Then, the leg parts 16 of the base 10 are inserted into the through holes 37 to seat the subassembly body on the printed wiring board 30. Under this state, the end parts of the leg parts 16 protruding to the back surface side of the printed wiring board 30 are, for instance, thermally melted to fix the base 10 to the printed wiring board 30. At this time, the other end parts of the leads 23 of the detection sensor 20, which are exposed from the sheet 21 are superposed on the terminals 34 on the printed wiring board 30. Then, the superposed leads 23 of the detection sensor 20 are connected to the terminals 34 by soldering. After that, the leads 33 of the extension cable 32 are connected to the terminals-34 on the back surface of the printed wiring board 30 by soldering so that the high value added product is completed. The printed wiring board may be provided with a control circuit, in other words, a logic circuit. The above-described subassembly body is installed on the printed wiring board provided with the logic circuit, hence a higher value added product can be manufactured. In this case, the extension cable 32 may not be required.

When the coordinate input device constructed as mentioned above or the high value added product is installed on the substrate of the keyboard input device of a computer and used as the stick type pointing device, if the force of fingers is exerted on the operating part 11 through the cap 18 from the forward and backward directions and the rightward and leftward directions thereof, the distortion generating part 12 located below the operating part 11 will be distorted so that the electric resistance value of each distortion gauge 22 changes. The signal of the electric resistance value is directly supplied to a control part (not shown) or the logic circuit (not shown) through the cable 32 shown in FIG. 4. The control part or the logic circuit calculates the direction of movement, the amount of movement, the moving speed, etc. of a cursor on a display on the basis of the signal from the cable 32.

Accordingly, in the coordinate input device or the high value added product, only the detection sensor 20 is bonded to the back surface of the distortion generating part 12 of the base 10 formed integrally with a resin material, so that the plurality of distortion gauges 22 and leads 23 can be simultaneously assembled with high efficiency and high accuracy, and the structure of the device can be more simplified and the installation workability thereof can be more improved. Further, since the operating part 11 of the base 10 does not need to ensure a space for bonding the distortion gauges 22 thereto, the height of the operating part can be reduced as short as possible as required, which can greatly contribute to the decrease in thickness of a portable personal computer. Still further, since the connecting parts of the distortion gauges 22 and the leads 23 are arranged on the back surface side of the base 10, dust does not adhere to the connecting parts. Thus, it is not necessary to provide a special protective layer, and therefore, a manufacture work can be more simplified from this point of view. In addition, since the base 10 serves as an insulating layer to protect the distortion gauges 22 from an electrostatic destruction (ESD), the coordinate input device according to the embodiment of the present invention is advantageous in view of its durability and reliability.

Furthermore, in the coordinate input device according to the embodiment of the present invention, the detection sensor 20 can be simply and precisely positioned to the distortion generating part 12 by employing the cross index 25 provided on the sheet 21 and the through hole 13 provided in the operating part 11 of the base 10.

Figure 5:
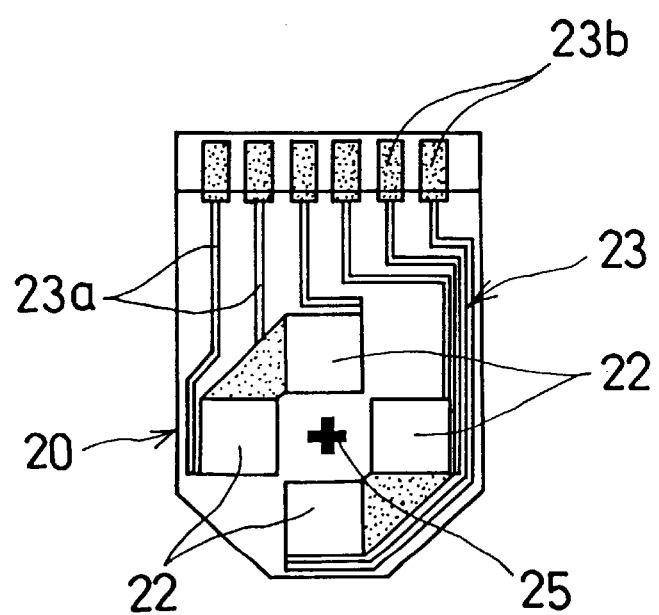
FIG. 5 is a plan view showing a different wiring pattern of leads in a detection sensor of the coordinate input device according to the present invention.

The wiring pattern of the leads 23 in the detection sensor 20 maybe arbitrarily formed. For example, as shown in FIG. 5, wide contact parts 23b may be connected to one end parts of the lead parts 23a with small and uniform width.

Further, in the above embodiment, although the length of the leads 23 of the detection sensor 20 is set to a short length so as to enhance the installation workability of the detection sensor to the printed wiring board 30, it should be noted that the configuration and length of the leads 23 may be arbitrarily determined. Thus, for instance, long size leads 23 with the form similar to that of the extension cable 32 shown in FIG. 4 may be formed integrally with the printed wiring board.

Still further, in the above embodiment, although first two adjacent distortion gauges 22A and 22B and second two adjacent distortion gauges 22C and 22D which are respectively arranged at intervals of 90° with different orientations are employed as pairs as illustrated in FIG. 1, it should be noted that first two distortion gauges 22A and 22C opposed to each other and second two distortion gauges 22B and 22D opposed to each other may be respectively employed as pairs in the distortion gauges 22.

Besides, needless to say, only two distortion gauges 22 may be used. In this case, the two distortion gauges are arranged at interval of 90° with different orientations, as illustrated by the pair of the distortion gauges 22A and 22B and the pair of the distortion gauges 22C and 22D.

As mentioned above, according to the coordinate input device of the present invention, since the plurality of distortion gauges and leads can be simultaneously assembled with high efficiency and high accuracy only by bonding the detection sensor to the back surface of the distortion generating part of the base formed integrally therewith, not only a workability and accuracy in assembling can be extremely improved, but also the operating part can be made compact without increasing the burden of cost or deteriorating an installation workability. Therefore, the coordinate input device of the present invention can greatly contribute to the decrease in thickness of the portable personal computer.

Further, since the connecting parts of the distortion gauges and the leads are provided on the back surface side of the base, dust does not adhere to the connecting parts. Therefore, a special protective layer does not need to be provided. Besides, since the base protects the distortion gauges from the electrostatic destruction, the coordinate input device becomes advantageous from the viewpoint of its durability and reliability, hence the present invention can generally realize significant effects.

What is claimed is:

1. A coordinate input device comprising:

a base having a plate shaped distortion generating part below a pole shaped operating part which are integrally formed; and a detection sensor having a plurality of distortion gauges and a plurality of leads connected to said distortion gauges which are integrally arranged on one plastic sheet, wherein said detection sensor has a structure in which said plurality of distortion gauges are put together so that said distortion gauges are bonded to the back surface of said distortion generating part of said base, and said plurality of leads are arranged in parallel and extended in one direction from said base.

2. A coordinate input device according to claim 1, wherein four distortion gauges are put together in a cross shaped arrangement in said detection sensor.

3. A coordinate input device according to claim 2, wherein said sheet is provided with a cross index for indicating the central position of the four distortion gauges and the arrangement directions thereof, a square through hole passing through said distortion generating part from the upper end of said operating part is provided in said operating part of said base, and said cross index is aligned with said through hole to position said detection sensor.

* * * * *